(12) United States Patent
Haber et al.

(10) Patent No.: US 7,573,021 B2
(45) Date of Patent: Aug. 11, 2009

(54) METHOD AND APPARATUS FOR MULTIPLE SCAN RATE SWEPT WAVELENGTH LASER-BASED OPTICAL SENSOR INTERROGATION SYSTEM WITH OPTICAL PATH LENGTH MEASUREMENT CAPABILITY

(75) Inventors: Todd C. Haber, Alpharetta, GA (US); Joel L. Mock, Norcross, GA (US); Jerry Volcy, Atlanta, GA (US)

(73) Assignee: Micron Optics, Inc., Atlanta, GA (US)

( * ) Notice: Subject to any disclaimer, the term of this patent is extended or adjusted under 35 U.S.C. 154(b) by 96 days.

(21) Appl. No.: 11/877,902

(22) Filed: Oct. 24, 2007

(65) Prior Publication Data
US 2008/0296480 A1 Dec. 4, 2008

Related U.S. Application Data

(60) Provisional application No. 60/862,756, filed on Oct. 24, 2006.

(51) Int. Cl.
*G01J 1/04* (2006.01)
(52) U.S. Cl. .................. 250/227.14; 250/221
(58) Field of Classification Search ............ 250/227.14, 250/227.18, 227.19, 227.23, 237 G, 221; 356/477–482; 385/12, 13, 37
See application file for complete search history.

(56) References Cited

U.S. PATENT DOCUMENTS

| | | | |
|---|---|---|---|
| 4,637,025 A | 1/1987 | Snitzer et al. | |
| 4,730,331 A | 3/1988 | Burnham et al. | |
| 5,212,745 A | 5/1993 | Miller | |
| 5,212,746 A | 5/1993 | Miller et al. | |
| 5,289,552 A | 2/1994 | Miller et al. | |
| 5,375,181 A | 12/1994 | Miller | |
| 5,422,970 A | 6/1995 | Miller et al. | |
| 5,509,093 A | 4/1996 | Miller et al. | |
| 5,563,973 A | 10/1996 | Miller et al. | |
| 5,838,437 A | 11/1998 | Miller et al. | |
| 5,892,582 A | 4/1999 | Bao et al. | |
| 6,115,122 A | 9/2000 | Bao et al. | |
| 6,241,397 B1 | 6/2001 | Bao et al. | |
| 6,327,036 B1 | 12/2001 | Bao et al. | |
| 6,373,632 B1 | 4/2002 | Flanders | |
| 6,449,047 B1 | 9/2002 | Bao et al. | |
| 6,504,616 B1 | 1/2003 | Haber et al. | |

(Continued)

OTHER PUBLICATIONS

Yun et al. (Jun. 1, 1998) "Interrogation of Fiber Grafting Sensor Arrays with a Wavelength-Swept Fiber Laser," *Optics Lett.* 23(11):843-845.

*Primary Examiner*—Que T Le
(74) *Attorney, Agent, or Firm*—Greenlee, Winner and Sullivan, P.C.

(57) ABSTRACT

The invention relates to optical sensor measurement methods that use a swept wavelength optical source to determine wavelength shift as well as to optical sensor systems that embody and employ these methods. A variable scan rate swept optical source is used to determine the optical path length from the optical interrogator to the optical sensors being measured. This data can then be used as desired or needed in implementing the sensor or making sensor measurements. In particular the data can be used in the optical sensor system to compensate for potential measurement errors due to the finite speed of light in the optical medium interconnecting optical sensors under test.

15 Claims, 12 Drawing Sheets

U.S. PATENT DOCUMENTS

| | | |
|---|---|---|
| 6,594,289 B2 | 7/2003 | Yamada et al. |
| 6,816,515 B1 | 11/2004 | Yun et al. |
| 6,904,206 B2 | 6/2005 | Bao et al. |
| 7,060,967 B2 | 6/2006 | Thingbo et al. |
| 7,063,466 B2 | 6/2006 | Ferguson |
| 7,157,693 B2 | 1/2007 | Thingbo et al. |
| 7,333,680 B2 * | 2/2008 | Yong et al. .................... 385/12 |
| 2008/0106745 A1 | 5/2008 | Haber et al. |

* cited by examiner

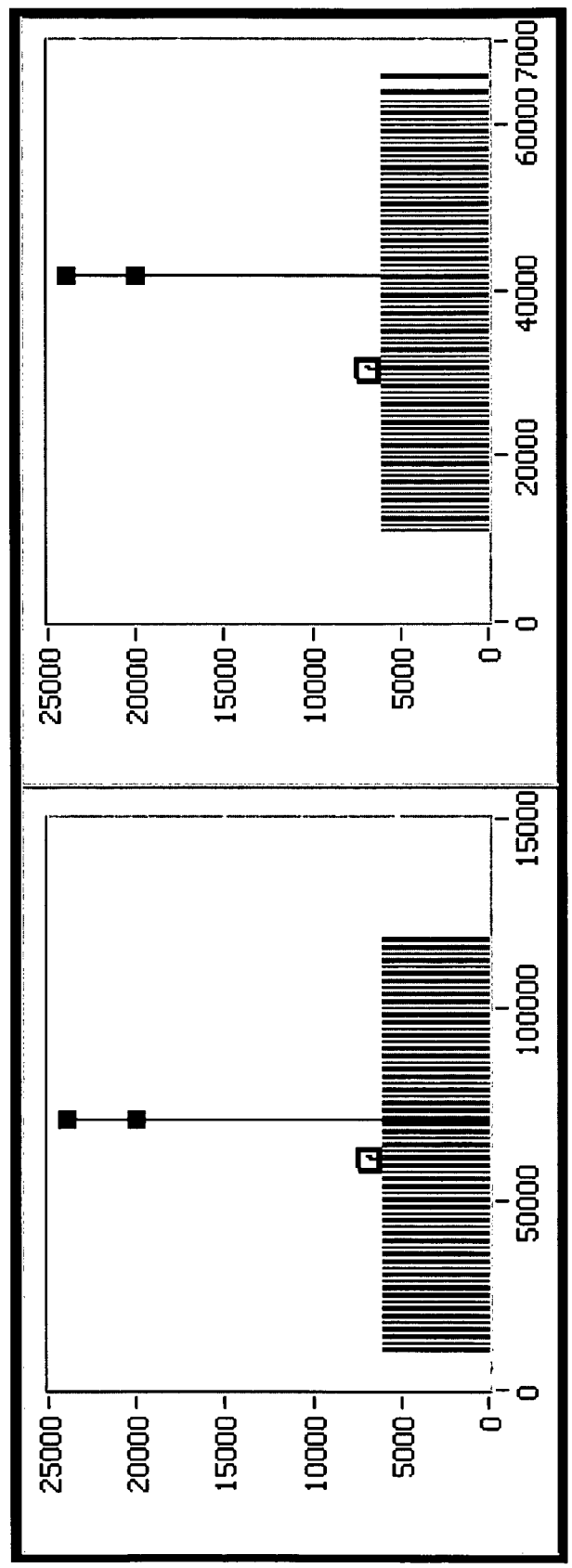

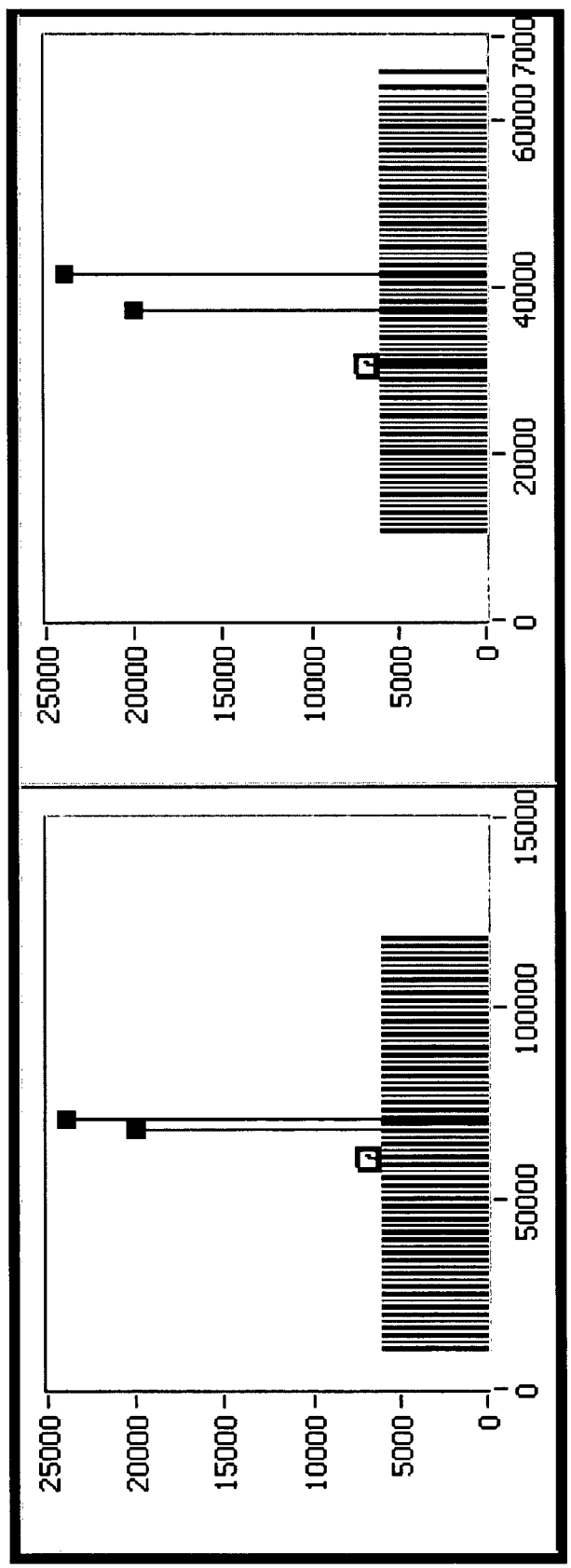

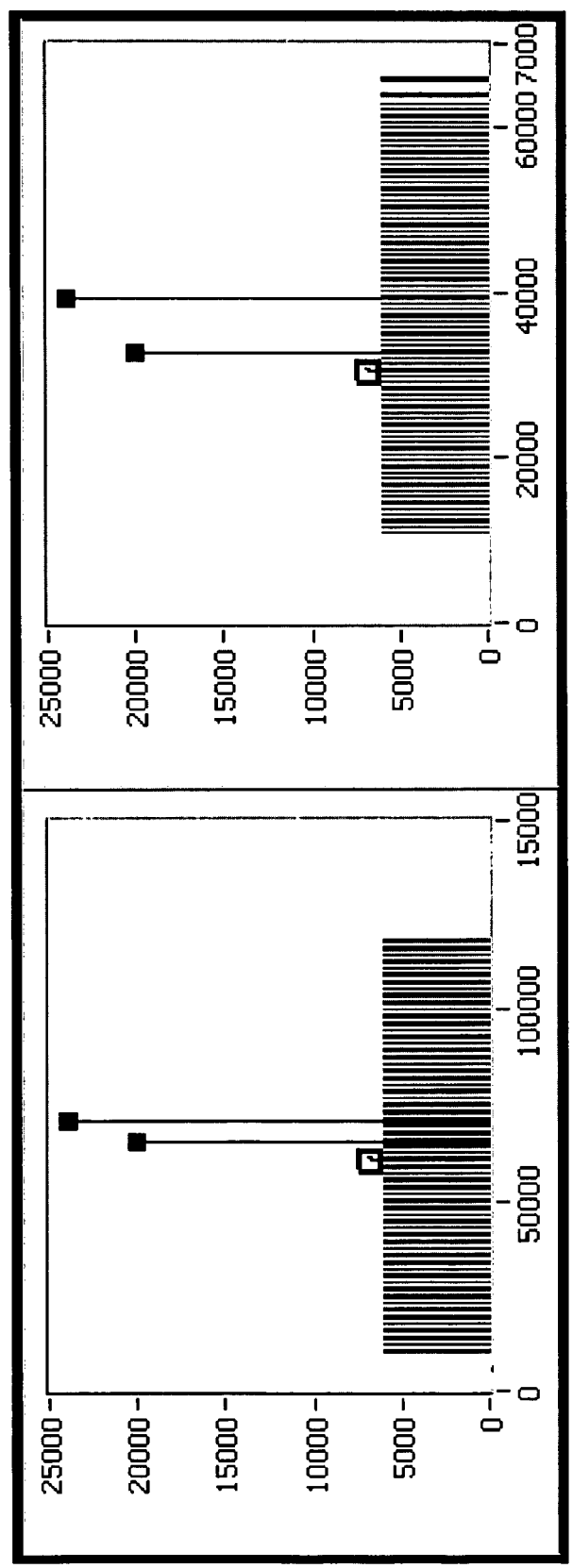

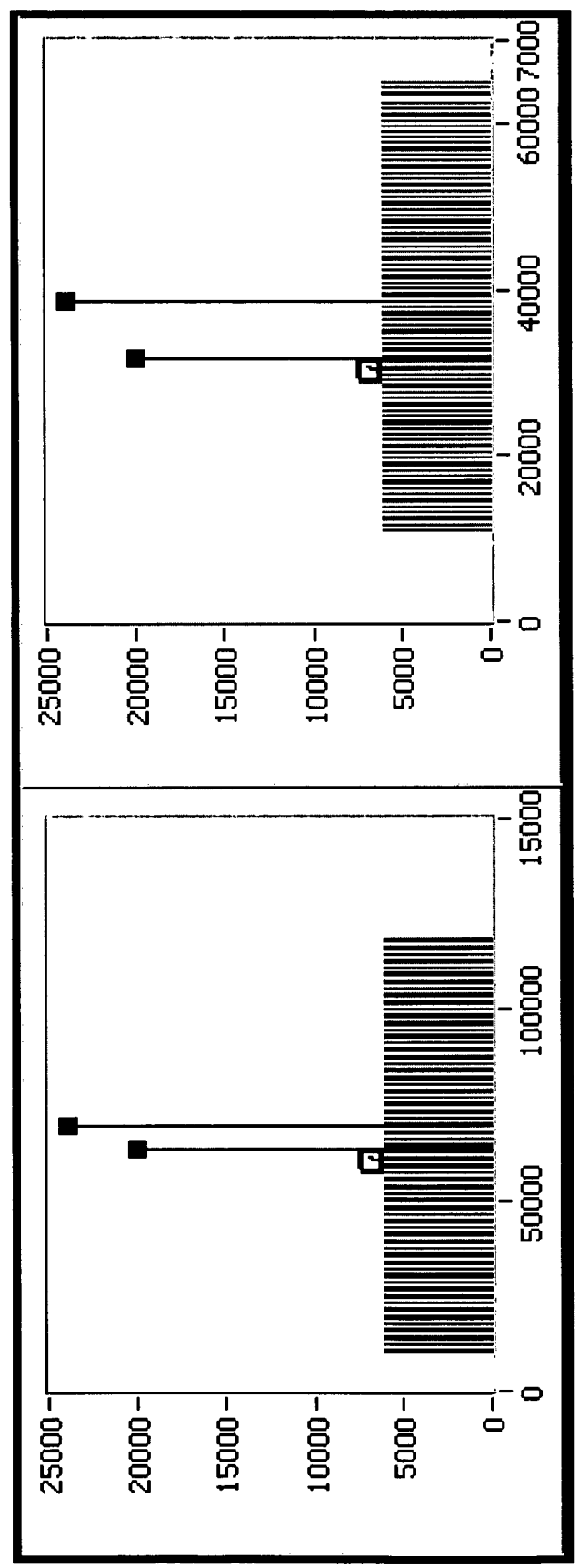

METHOD AND APPARATUS FOR MULTIPLE SCAN RATE SWEPT WAVELENGTH LASER-BASED OPTICAL SENSOR INTERROGATION SYSTEM WITH OPTICAL PATH LENGTH MEASUREMENT CAPABILITY

CROSS-REFERENCE TO RELATED APPLICATIONS

This application claims priority to U.S. provisional application 60/862,756 filed Oct. 24, 2006 which is incorporated by reference in its entirety herein.

BACKGROUND OF THE INVENTION

Optical sensing applications are on the rise in such diverse fields as civil structures, aerospace, oil and gas, among many others. Much progress continues to be made on optical sensor technology. As sensors increase in performance and sophistication, an increasingly pressing need emerges for optical measurement equipment (e.g., sensor interrogators, including light source, detectors and wavelength references) to monitor the optical sensors with speed, accuracy and reliability over a variety of physical and environmental conditions.

Although sensor applications vary, the following sensor interrogator requirements are common for many applications. Interrogators should provide accurate and reliable, low noise wavelength measurements (preferably +/−2 to 5 pm) for many sensors (~50-~100's of sensors) and preferably thousands of sensors. Interrogators should be able to function with multiple channels (e.g., 4 channels and preferably be expandable to 16 channels. Interrogators should have high speed data acquisition (e.g., 250 Hz -1 KHz) with high optical power to ensure high dynamic range (DR) at high acquisition speeds and deterministic data acquisition and transfer to PC (e.g., compatibility with the TCP-IP communications protocol.) Interrogators should also have wide operating temperature range (e.g., 10-4° C., or 0-50° C.) and exhibit mechanical reliability for field applications (such as outlined in Telcordia Technologies document, GR-63-CORE). Further, the interrogators should be able to provide accurate and reliable sensor measurements even with long fiber lead-in (e.g., e.g., 100 km Round Trip).

A variety of basic interrogator system design options exist that attempt to meet the broad requirements listed above.

A system with broadband source, dispersive element, and a diode array-such systems cannot achieve the required wavelength measurement repeatability and resolution with commercially available diode arrays. Low broadband source power limits the ultimate needed combination of channel count/sensor capacity and dynamic range/distance to sensors.

A system with broadband source and an optical spectrum analyzer (OSA) or multi-line wavelength meter-laboratory OSAs are large, slow, expensive, and do not have a wide operating temperature range. Multi-line wavelength meters acquire data at slow speeds only, and are not mechanically robust. Again low broadband source power limits the ultimate needed combination of channel count/sensor capacity and dynamic range/distance to sensors.

A system with an optical time domain reflectometer (OTDR) OTDR/TDM (time-dependent multiplexing)-the low loss budget of such systems precludes their use with the preferred larger number of sensors and/or channels, and data acquisition rates scale down with increasing sensor counts. The minimum physical grating spacing limits use of such a system in some applications.

A system with an external cavity tunable laser with power meter and wavelength meter-external cavity tunable lasers are slow, expensive, and do not have a wide operating temperature range or the required mechanical robustness. The addition of power meters and wavelength meters add to the bulk, complexity, and cost, as well as reduce reliability and speed. The polarization properties of the narrow line lasers may not be an ideal match for all sensing applications.

In contrast, an interrogator employing a swept wavelength laser source, such as that described in U.S. Pat. No. 6,449,047 offers the required optical output power for high channel and high sensor counts without compromise to either high data acquisition speed or high measurement dynamic range. Using a swept wavelength laser source, an optical sensor interrogator can collect data simultaneously on tens to hundreds of sensors across four channels at speeds from 100 Hz -1 kHz (with potential in the 2-10 kHz range) with 25 dB dynamic range for each sensor. High output power also enables a physical reach to faraway sensors, making new optical sensor applications possible. For example, given an optical fiber attenuation constant of 0.22 dB/km (e.g., for Corning SMF-2® optical fiber), the si425 optical sensing interrogator (Micron Optics, Atlanta Ga.) can accommodate fiber lead-in lengths of over 100 km, round trip. The thermal and mechanical robustness of the swept wavelength fiber laser enables a field-ready solution that meets stringent reliability requirements for thermal shock and storage, transportation and office vibration, and high relative humidity requirements, as well as the wide operating temperature range needed for many applications. Swept wavelength laser sensor interrogator designs have passed all thermal and mechanical storage and shock conditions set forth in the Telcordia GR-63, and exhibit wide operating temperature ranges of 10-40° C. and 0-50° C. High resolution detection and low noise enable the wavelength resolution and repeatability required for the most stringent optical sensing measurements. Data generated at 100 Hz -1 kHz allows for rapid and convenient averaging of sensor values to generate measurements sensitivities greater than 0.02 pm.

Thus, although several measurement methodologies can address some fraction of the listed requirements, an interrogator system employing a swept wavelength fiber laser system is uniquely capable of satisfying all of the above-listed requirements simultaneously.

Use of a swept wavelength laser as the optical source for a fiber optic sensor interrogation system has many benefits. In order to generate accurate and reliable sensor measurements, however, the swept wavelength laser of such a sensor interrogation system must be continually calibrated. Since the source is swept, the sensor wavelength as perceived in such systems is susceptible to offsets generated by the finite speed of light in optical fiber. The present invention provides a method for calibrating sensor interrogation systems, particularly those which employ swept wavelength lasers, for potentially non-linear source effects and the associate effects of the finite speed of light in transmission fiber coupled to the optical sensors.

SUMMARY OF THE INVENTION

The current invention relates to apparatus and methods designed to measure narrow band optical sensors, such as fiber optical sensors, and compensate for potential sensor wavelength error associated with use of a sensor interrogation system having a swept wavelength optical source. The apparatus and methods also provide for measurement of distance from the apparatus to one or more (preferably more than one)

interconnected fiber optic sensors with a high degree of accuracy. The apparatus and methods of this invention are particularly useful in those systems in which sensors generate multiple narrow band optical signals, such as those generated by fiber Bragg Grating sensors and fiber Fabry-Perot sensors e.g., fiber F-P interferometers). The apparatus and methods of this invention are particularly useful in those interrogation systems in which a swept wavelength laser, including a swept wavelength fiber laser, are employed as the tunable light source.

The inventive apparatus incorporates a swept wavelength (i.e., a wavelength tunable) optical source that is continuously monitored with an integrated optical wavelength reference. The optical detection system processes signals from the optical wavelength reference channel(s) and the sensor measurement channels simultaneously. Computer control (preferably built-in) is used to control the transmitter and receiver circuitry, perform various computations on the measurement data, and provide a user interface.

In the sensor interrogator systems the fundamental sensor wavelength measurement is performed by comparing the time delays between signals detected on the optical reference channel with the signals processed by the sensor measurement channels. When the scan rate of the optical source is very low or the distance from the interrogator to the optical sensors is very short there is a direct timing correlation between the optical reference channel signals and the sensor measurement signals. However, as the scan rate or sensor optical path length is increased, delays caused by the finite speed of light in the interconnecting optical fibers will induce a delay in the returned optical signal to the detection circuitry. The use of different scan rates of the optical source will result in different apparent sensor wavelength shifts, although the time of flight down the fiber for a given sensor will actually be the same. The distance to a given sensor can be calculated employing data acquired from the same sensor for two different scan rates. In a specific embodiment, iterative calculations of the time of flight correction for a wavelength measurement of given sensor at two different known scan rates, assuming the actual time of flight to be the same for both measurement conditions, enables accurate and reliable determination of the physical distance from the interrogation system to the sensor. The method can be applied to measure the optical path length (and actual distance with knowledge of the index of refraction of the fiber) from each sensor in a fiber optic sensor array to the interrogation system. The optical path length to each sensor can then be used to accurately measure sensor wavelength, of each sensor in an array, by correcting for wavelength offset due to sensor signal time delay.

The invention, in particular, provides a method using multiple laser scan rates to deduce the optical path length to multiple narrow band optical sensors, such as FBG sensors. The invention further relates to laser and interrogator system configurations used to make such multiple scan rate measurements. The invention further provides a method for deducing optical path lengths (and actual distances) from an interrogator to one or more optical sensors in a sensor system based on the normalized proportional time delays generated by the time-of-flight of each sensor measurement at each different laser scan rate. The optical path lengths generated by calculations described herein can be output to a display, saved to memory, printed or otherwise generated as output and used for various purposes including their use in sensor measurements to compensate for time-of-flight induced sensor measurement offsets. In a specific embodiment, optical path length data is output into a computer or processor system to compensate for offsets in sensor measurements. Calculations performed in this method can be solved either in closed form or iteratively. The invention also provides a sensing method in which such offsets are compensated for to provide more accurate measurement.

More generally, the descriptions and methods herein can employ distance information derived from any technique to compensate the time-of-flight induced wavelength offsets in swept wavelength laser based optical component measurements. Distance information can, for example, be derived from standard Optical time domain reflectometers (OTDRs), but OTDRs cannot distinguish spectrally narrow features, such as those generated by FBGs. In a preferred method, particularly applicable to systems in which spectrally narrow features are generated, distance measurements are made using a swept laser interrogator system through a series of multiple speed wavelength scans. This method can be executed on sensors and fiber which are already installed and does not require the system or sensors to be disturbed or uninstalled and does not require any additional equipment beyond the interrogation system itself.

An additional object of this invention is to provide an automated method such that the optical sensor interrogator can perform the sensor optical path length measurements and calculate the appropriate wavelength correction factors.

BRIEF DESCRIPTION OF THE DRAWINGS

In FIG. 5A, the length of the lead in fiber (L) is short and its offset affect is negligible. In contrast, in FIG. 5B the length of the lead in fiber is sufficiently long to result in non-negligible wavelength offset. Examples are described in the text where L is 100 m and 20 Km.

FIGS. 8A-8H is a series of four graphical representations of the iterative dual scan rate distance measurement procedure as applied in a system as described in FIGS. 1-3. In FIGS. 8a-8H the taller of the two tallest peaks is the "actual received signal" described in the text as "black". The shorter of the two tallest peaks is the "time adjusted signal" described in the text as "blue". The "FFPI" reference peaks are the series of equal height peaks without a dot at the top of each, described as "red" in the text. The reference FBG component signal of the wavelength reference is the single lighter peak of equal height to the FFPI peaks, described as white in the text. FIGS. 8A, C, E and G represent measurements made at a first scan rate of the swept optical source (specifically 500 Hz) and FIGS. 8B, D, F and H represent measurement made at a second scan rate of the swept optical source (specifically 1 KHz). In FIGS. 8A (500 Hz) and B (1 KHz) using a 0 m distance estimate, the wavelength difference is 4.1705 nm. In FIG. 8C (500 Hz) and D (1 KHz) using a 2085 m distance estimate, the wavelength difference is 1.998 nm. In FIG. 8E (500 Hz) and F (1 KHz) using a 3795 m distance estimate, the wavelength difference is 0.225. In FIG. 8G (500 Hz) and H (1 KHz) using a 4015.2 m distance estimate, the wavelength difference is 0.0001 nm.

DETAILED DESCRIPTION OF THE INVENTION

Figure 1:
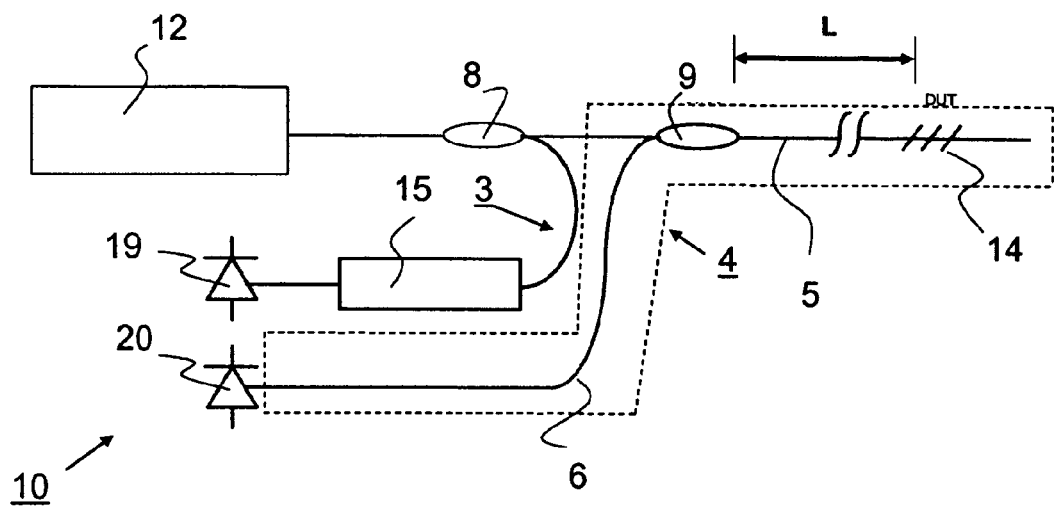
FIG. 1 is a schematic diagram of optical elements of a sensor interrogation system employing a swept wavelength source.

"Swept Optical Source" or Swept Wavelength Optical Source" refers to a class of optical sources that output a narrow optical spectrum that can be electrically or mechanically tuned over a relatively wide wavelength range, generally 40 nm or more. Of particular interest for sensing applications are those sources which provide wavelengths within the 1.5 µm wavelength range. Examples of swept wavelength optical sources that can be used in the present invention include swept wavelength fiber lasers, external cavity swept wavelength lasers, distributed Bragg reflector lasers (DBRLs) and broadband sources which in combination with tunable filters provide swept wavelength optical sources. Exemplary external cavity swept wavelength lasers, include among others, those described in U.S. Pat. No. 6,594,289. Broadband sources such as superluminescent LED sources (SLED), as exemplified in U.S. Pat. No. 4,730,331, and superradiant sources, such as exemplified in U.S. Pat. No. 4,637,025, can be combined with tunable filters, particularly fiber Fabry-Perot tunable filters (see, among others reference listed below, U.S. Pat. No. 6,373,632), to provide swept wavelength optical sources. Swept or tunable optical sources useful in this invention include those that can operate at continuously or discretely adjustable sweep rates. A swept wavelength laser that is particularly useful for sensor application is that described in U.S. Pat. No. 6,449,047. An additional swept wavelength laser that can be used herein is exemplified by that of U.S. Pat. No. 6,816,515. Swept optical sources with which the methods of this invention can be implemented for sensor wavelength offset correction or simply to measure distance to one or more optical sensors are those which can be operated at least two different scan rates. Preferably, the swept optical source can be operated at scan rates that differ by a factor of 1.5 to 3.

A "wavelength reference" is an instrument that can identify and determine the wavelength of light generated by the swept optical source at a given point in the scan. In sensor interrogation systems of this invention, the wavelength is coupled to an appropriate optical detector, such as a photodiode. Wavelength references particularly useful in this invention are those described in U.S. Pat. Nos. 5,838,437, 5,892,582, 6,115,122 and 6,327,036. The wavelength references of these patents include wavelength calibrated multi-wavelength references which comprise an interferometer which provides a spectral output that is a comb of peak spanning a wavelength range where the spacing between the peaks of the comb is accurately known. The wavelength reference also comprises a fiber Bragg Grating (a reference FBG) which provides spectral output (which can be a peak or a notch at the central or characteristic wavelength of the reference FBG) at a selected wavelength within the wavelength range of the comb. The spectral output of the FBG marks a peak of the comb identifying its wavelength and the combined output of the interferometer and the FBG provides a reference spectral output. The interferometer can, for example, be a fixed cavity fiber Fabry-Perot interferometer.

The term optical sensor is used generally herein to refer to any sensor the spectral output of which is sensitive to a change in the environment of the sensor (temperature, pressure, strain, etc.) and wherein a change in the spectral output (intensity, wavelength, polarization, phase, etc.) is indicative of and can be used to measure or sense a change in the environment of the sensors. The sensor interrogation systems of this invention are particularly useful for measurement of changes in wavelength of optical sensors due to changes in the environment of the sensor. The invention particularly relates to fiber optical sensors in which the fiber is the transducer which facilitates sensing. In specific embodiments, the optical sensors of this invention are fiber Bragg Gratings (FBGs).

An optical fiber sensing system is basically composed of a light source, optical fiber; a sensing element or transducer and a detector. The principle of operation of a fiber sensor is that the transducer modulates some parameter of the optical system (intensity, wavelength, polarization, phase, etc.) which gives rise to a change in the characteristics of the optical signal received at the detector. Sensing elements of an optical fiber sensing system include FBGs. An optical sensing system can contain one and preferably more than one FBG.

A fiber Bragg grating is wavelength-dependent filter/reflector formed by introducing a periodic refractive index structure within the core of an optical fiber. Whenever a broad-spectrum light beam impinges on the grating, will have a portion of its energy transmitted through, and another reflected off. The reflected light signal will be a very narrow peak centered at the Bragg wavelength (also termed the central or characteristic wavelength which corresponds to twice the periodic unit spacing Λ. The transmitted light signal comprises a spectrum with a notch centered at the Bragg or central wavelength. Any change in the modal index or grating pitch of the fiber caused by strain or temperature will result in a shift in the Bragg or central wavelength characteristic of a given FBG. An optical sensor array typically contains a plurality of sensing elements, such as FBGs. A sensing array may contain a plurality of FBGs each having a different Bragg or central wavelength. Alternatively, in a given sensor array may contain a plurality of sensor channels wherein FBGs in a given channel each have a different Bragg or central wavelength. A sensor array can comprise a plurality of such sensor channels.

This invention provides a method for measurement of the optical path length and the physical distance between an interrogator system (actually the measurement detector of the interrogator system) and one or more optical sensors, such as FBGs in a sensor channel or array. The sensors are optically coupled in such channels and arrays to the sensor interrogation system via optical fiber. The terms optical pathway and distance are used interchangeably herein because the physical distance can be readily determined form the optical path length if the index refraction of the fiber coupling the sensors to the interrogator is known.

FIG. 1 illustrates an optical schematic for an optical sensor interrogation system (10) employing a swept wavelength optical source. A wavelength tunable optical source (e.g., a swept wavelength laser (12)) is connected to an optical reference channel (3) and any number of optical sensor measurement channels (e.g., 4, only one measurement channel is shown for simplicity). The sensor channel can comprise one or more optical sensors. The optical source can be swept across a programmable (selected) wavelength range at two or more (multiple) sweep rates. A portion of the optical source signal is coupled via optical coupler 8 (e.g., a 90/10 (measurement/reference) coupler can be used) to the reference channel 3 and to wavelength reference (15) that monitors the transmitted output wavelength versus time. The wavelength reference identifies and measures wavelengths from an optical device, such as an optical sensor and particularly those from Fiber Bragg Gratings (FBGs). The reference channel also contains an optical received or detector (19). The sensor measurements, e.g., channel 4 is outlined in a dashed box in FIG. 1 and includes coupler 9 (e.g., a 50/50 coupler), optical sensor 14 and optical receiver (detector) 20. Optical coupler 9 couples light from source 12 through a length of fiber (L) to the optical sensor 14 and couples light from the sensor into detector 20. Each sensor measurement channel also contains associated data processing hardware (not shown in FIG. 1) that determines a particular characteristic of the detected sensor waveform, such as the peak, center, or 3 dB value. The time at which a particular sensor measurement is triggered is correlated to the optical source wavelength supplied via the optical reference channel.

Figure 2:
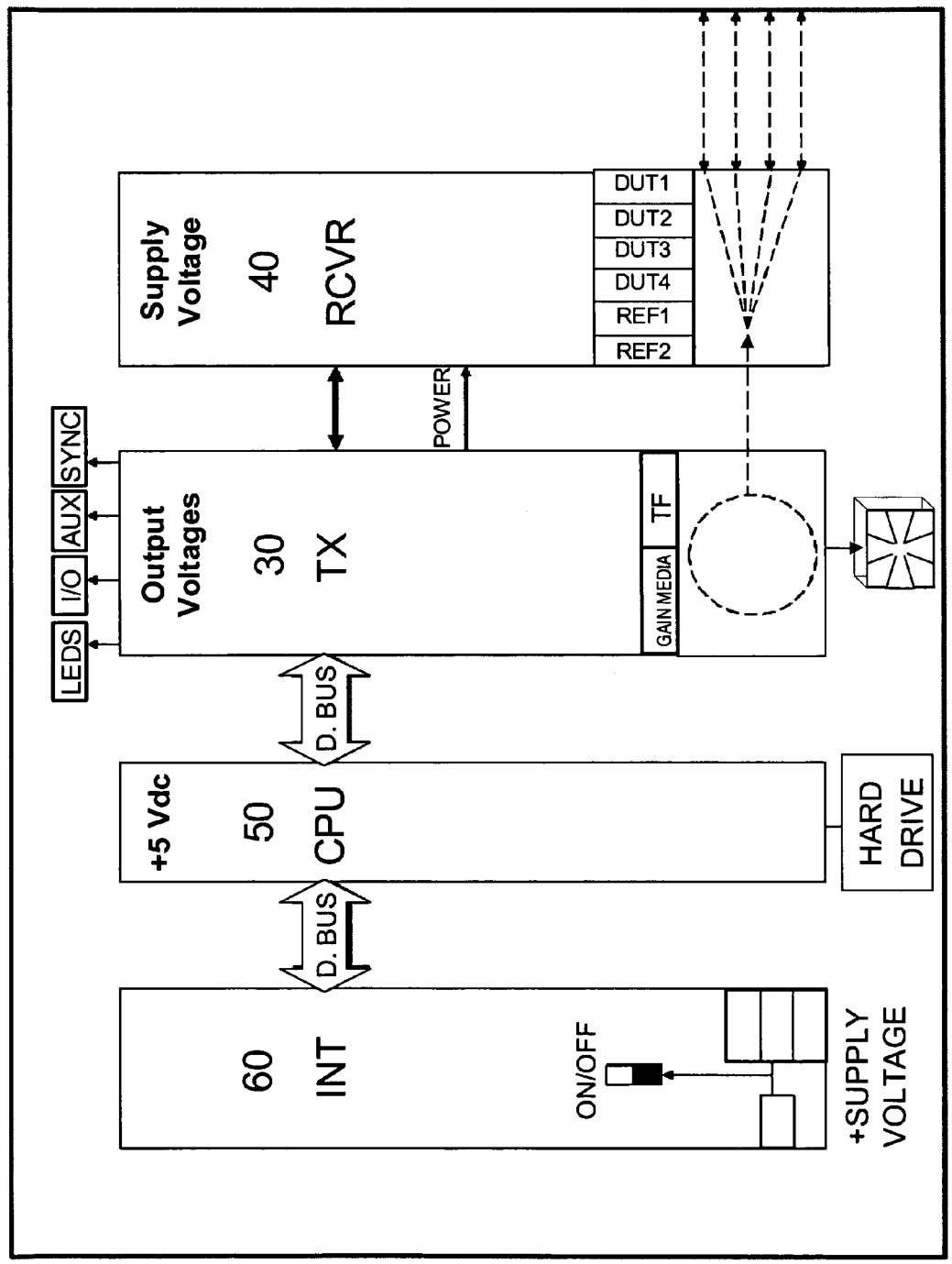
FIG. 2 is a functional block diagram of a sensing interrogator system employing a swept optical source with distance measurement capability

FIG. 2 is a functional block diagram of an interrogator employing a swept optical source with distance measurement capability. The four main functional blocks represent a laser transmitter control module (30), an optical receive module (40), a computation and control module (50), used for hardware control and data processing, and the interface(60), used for power distribution and inter-module cable management.

The interface is an interface PCB that provides the necessary voltage regulation, distribution and filtering for the interrogator circuits. It also provides a means to mount user accessible power connections and switching functions.

The Central Processing Unit (CPU) is a commercially available Single Board Computer (SBC) that performs all the control and communication functions required, as well as performing the various calculations on data supplied by the interrogator's data acquisition system.

The Transmitter block (detailed in FIG. 3) is used to control the various optical components (Semiconductor Optical Amplifier, SOA, Fiber-Fabry-Perot Tunable Filter, FFPT, etc.) and decode and distribute the SBC bus signals.

The Receiver block (see FIG. 4) contains the necessary electro-optic components required to convert the optical signals to electrical equivalents and process for use by the SBC.

Figure 3:
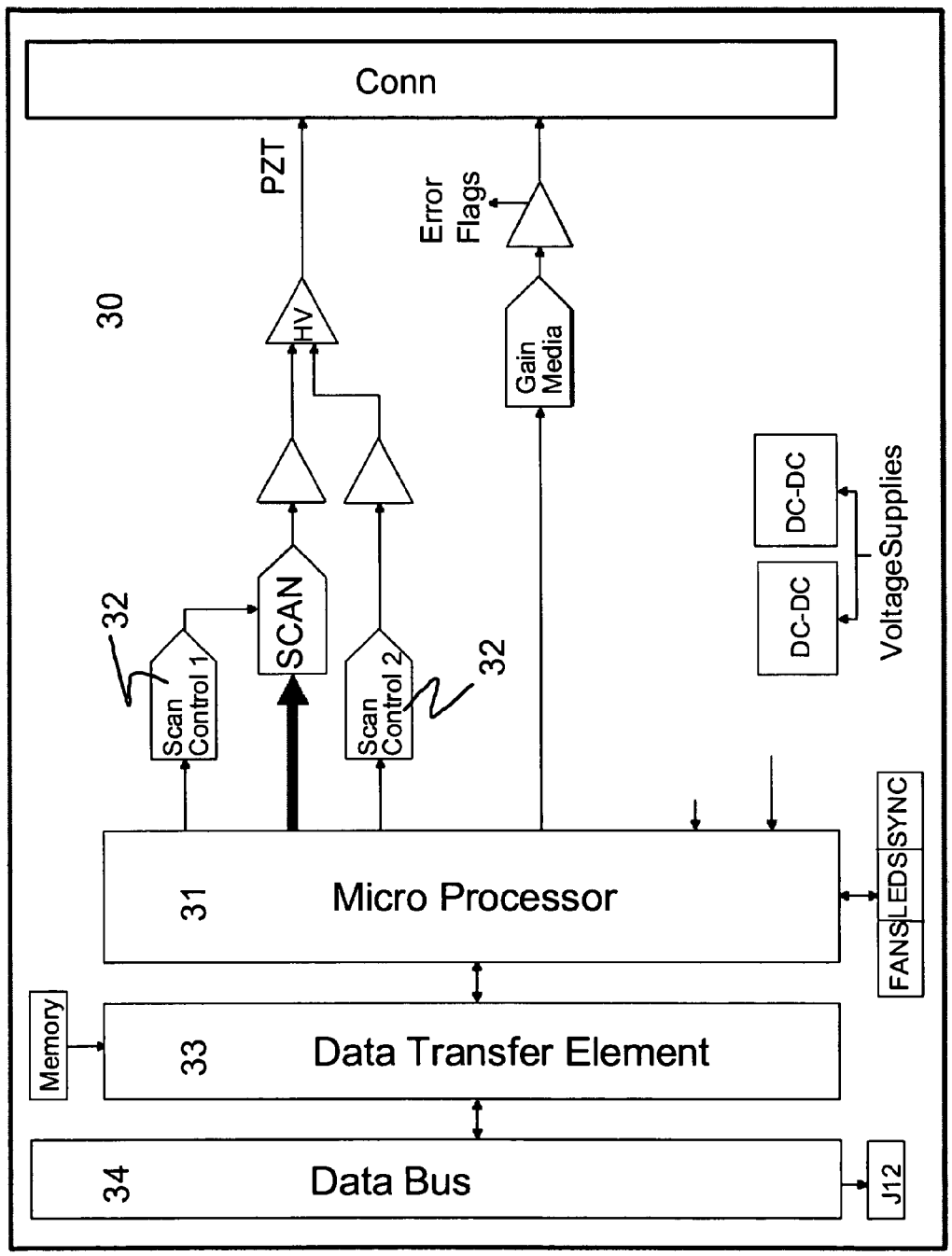
FIG. 3 is a functional block diagram of the laser transmitter module (TX) included in the ideal embodiment of FIG. 2.

FIG. 3 is a detailed block diagram of the main transmitter circuits of the transmitter module (TX, 30) of FIG. 2. A microprocessor (31) interfaces to multiple scan control elements (32) that affect the sweep rate and range of the transmitter laser, as well as control operational parameters for the laser gain medium. Data is transferred to and from the microprocessor element via a data transfer element (33) through a data bus (34). Bus signals are managed and routed to appropriate circuits via a "bus-bridge controller". An on-board Field-Programmable Gate Array (FPGA) decodes and distributes the output of the bridge controller. The circuits programmed into the FPGA provide amplitude, bias and frequency control of the FFPTF via precision digital-to-analog converters. The output of these converters is filtered and amplified and used to drive the tunable optical filter. Additional circuits provide drive and Thermoelectric Cooling (TEC) control for the SOA.

Figure 4:
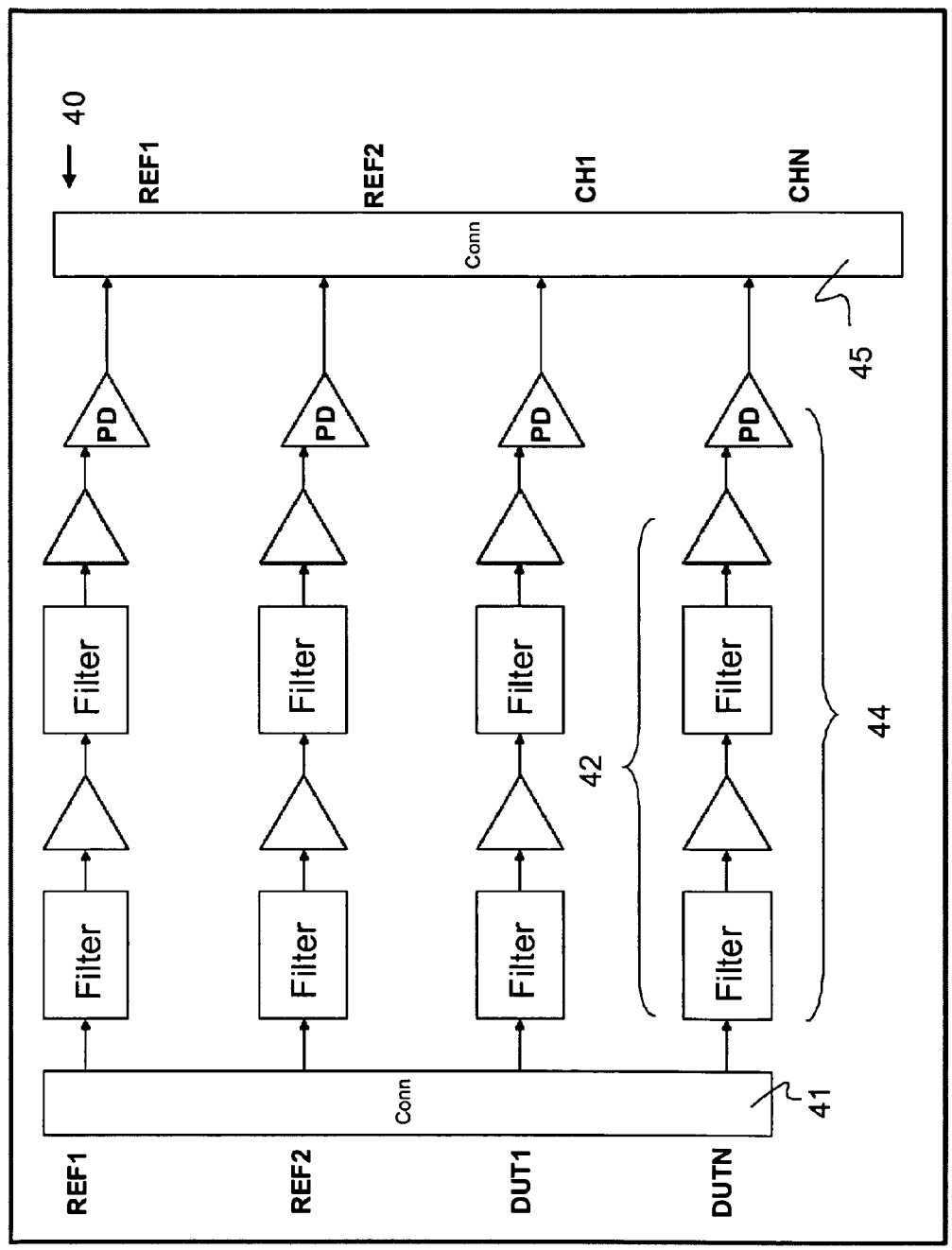
FIG. 4 is a functional block diagram of the receiver module (RX) included in the ideal embodiment of FIG. 2.

FIG. 4 is a detailed block diagram of the receiver circuits of received module (40) included in FIG. 2. High-speed, low-noise, transimpedance amplifiers convert the optical signals of interest to an electrical equivalent. The resulting electrical signals from both reference and DUT optical signals are sent to the receiver module (40) electronics through connector (41). These signals are further amplified and filtered (42) and peak-detected (44). From the peak detection circuitry, relative timing pulses are sent to the CPU module (50) via a connector (45) for wavelength calibration and distance measurements. High speed comparators are used to provide digital signals corresponding to the peak of optical sensors being tested.

Figure 5A:
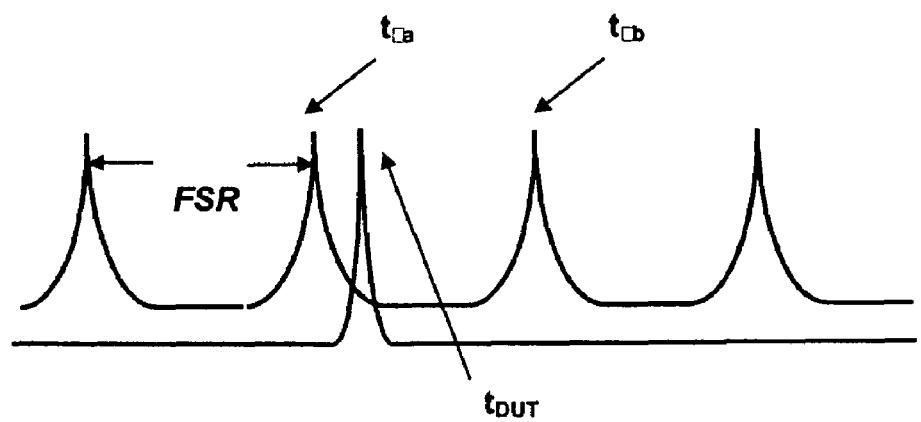
FIGS. 5A and B are schematic diagrams illustrating the interpolation method for determination of sensor wavelength using a wavelength reference in a system of FIG. 1.
Figure 5B:
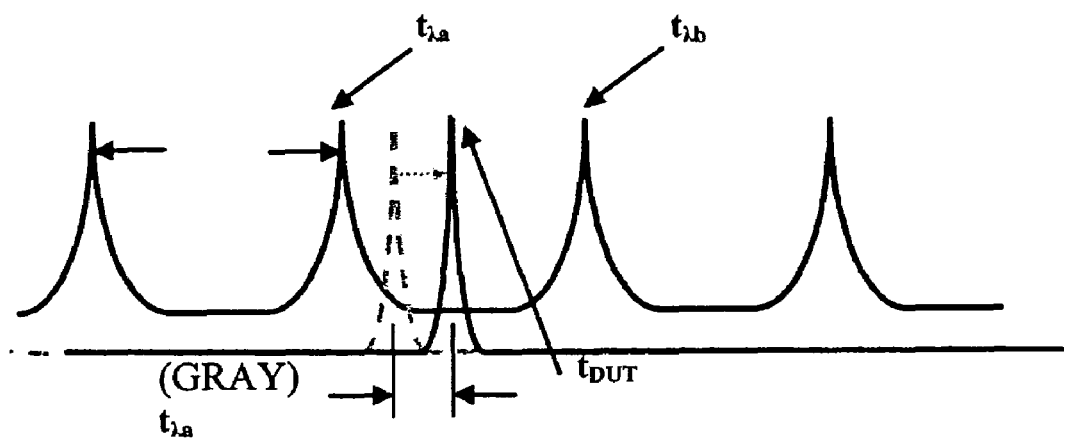

FIGS. 5A and 5B illustrate the basic measurement technique used in an optical swept source interrogation system of FIG. 1 to determine the optical sensor wavelengths under test. In this example, when the optical reference is scanned by the swept wavelength (i.e., tunable) optical source, well-defined peaks are produced at evenly spaced, known wavelength intervals. Two wavelength peaks, designated $t_{\lambda a}$ and $t_{\lambda b}$, respectively, to indicate the time associated arrival of the peak at the detector, represent the reference wavelength peaks just below and above the sensor wavelength under test, $t_{DUT}$. The wavelength of the optical sensor under test is determined by interpolation based on the known reference wavelength peaks.

Device Under Test (DUT) sensor wavelength calibration is calculated based upon the comparison to known reference wavelengths, and the time at which both the DUT peaks and the reference peaks reach the photodiodes. An interpolation is performed to calculate the DUT wavelength, as is demonstrated in each of the two following examples.

The following demonstrates the basic methodology for making calibrated swept wavelength based sensors measurements, as well as demonstrates the effect of time of flight delays in the optical signal on the resulting sensor measurements.

Sensor detection takes place in the following manner, illustrated by the diagram in FIG. 1. The swept wavelength source (12) emits light at a range of wavelengths that increase with time. The light is split between reference (3) and one or more sensor measurement channels (e.g., 4). A portion of the light passes through the optical reference (15) to the reference detector (19) e.g., a photodiode. Another portion of light from the source is transmitted to the one or more sensor(s), e.g., 14, is reflected, and passes via coupler 9 to the sensor measurement detector 20, which can be a photodiode.

A simultaneous acquisition of these two photodiodes is made, resulting in a set of data approximated by the illustration in FIG. 5A. Relevant to the calculation of the sensor (DUT) wavelength are five parameters: 1) $t\lambda a$, the time at which reference peak a is detected; 2) $\lambda a$, the wavelength of reference peak a; 3) $t\lambda b$, the time at which reference peak b is detected; 4) $\lambda b$, the wavelength of reference peak b; and 5) $t_{DUT}$, the time at which the sensor, or DUT, peak is detected. The DUT wavelength is calculated in the following manner:

$$\lambda_{DUT} = \lambda_a + (t_{DUT} - t_{\lambda a})/(t_{\lambda b} - t_{\lambda a}) * FSR, \text{ where} \quad \text{Equation 1:}$$

$$FSR = \lambda_b - \lambda_a \quad \text{Equation 2:}$$

For illustrative purposes, some values for the calculations will be assumed. As the calculation is based upon interpolation, and offset will cancel out, so $t_{\lambda a}$ will be assumed equal to zero. Given a Free Spectral Range (FSR) of ~800 pm, a full scan of the tunable laser of ~80 nm, and a sweep rate of the laser of 250 Hz (thus a single "upscan" takes 2 ms), $t_{\lambda b}$ can be calculated to be (0.8 nm/80 nm)*2 ms=20.0 μs. If $t_{\lambda b}$ was measured to be 5.0 μs, and $\lambda_a$ was 1520.000 nm, then:

$$\lambda_{DUT} = 1520.000 \text{ nm} + (5.0 \text{ μs}/20.0 \text{ μs})*0.8 \text{ nm} = 1520.200 \text{ nm}.$$

The following illustrate the effect on sensor wavelength interpolation of the presence of fiber lead-in (L is greater than zero, and is typically much greater than zero). Given that light must travel at a speed dictated by the transmission medium, there is a finite length of time for any optical signal to traverse a specified distance. For many sensor applications, this distance is relatively short compared to the speed of light and the acquisition speed of the interrogation system. In the case of a high-speed swept wavelength laser system, the presence of significant lengths of fiber lead in can yield a DUT timing delay that manifests as an apparent wavelength offset of the sensor wavelength.

Light travels in a vacuum at a speed of ~2.997×108 m/s, typically designated by the symbol c. This speed changes with the refractive index of the transmission medium, n, and can be calculated as:

$$c_n = c_{vac}/n \qquad \text{Equation 3:}$$

such that in optical fiber, light travels at 2.997×108/ 1.5=1.9986×108 m/s, where n=~1.5.

At this speed, the round trip travel time down, for example, 100 m of fiber is: $2*1.0\times10^2$ m/$1.9986\times10^8$ m/s=1.0 μs.

This time delay is illustrated by the shift in the DUT trace in FIG. 5B. Since the wavelength calibration of the DUT sensor is a time-based linear interpolation, the 1.0 μs delay will have direct influence on the resulting wavelength value. The calculation in this example, where L is 100 m, is as follows:

λDUT=1520.200 nm+((1.0 μs)/20.0 μs)*0.8 nm=1520.240 nm.

This result indicates that with a 250 Hz swept wavelength laser system, an increase of 100 m of fiber lead-in will increase (offset) the detected wavelength of a DUT sensor by ~40 pm.

A similar calculation is performed where the fiber lead in (L) is very large e.g., 20 Km.

$2*20.0\times10^3$ m/$1.9986\times10^8$ m/s=200 μs.

and the wavelength calculation is:

λDUT=1520.200 nm+((200 μS)/20.0 μS)*0.8 nm=1528.0 nm.

This result indicates that with a 250 Hz swept wavelength laser system, an increase of 20 km of fiber will increase (offset) the detected wavelength of a DUT sensor by ~8 nm.

The transmission delay of the swept wavelength laser over lead-in fiber scales linearly with both the local slew rate (variation in scanning rate) of the swept source and the length of the lead-in, both resulting in a linear wavelength offset. Table 1 shows examples of approximate wavelength shift for a 5 Hz SL system and a 250 Hz SL system for various fiber lengths, assuming an idealized linear wavelength sweep. It is important to note that these values assume a linear wavelength sweep and are estimates only. Actual wavelength shifts will vary from these values, but can still be completely corrected within the sensor interrogator instrument.

TABLE 1

Approximate perceived sensor wavelength offset as a function of swept wavelength laser slew rate and round trip fiber lead-in distance.

| RT Fiber Lead-In | 5 Hz Swept wavelength laser | 250 Hz Swept wavelength laser |
|---|---|---|
| 2 m | 0.008 pm | 0.4 pm |
| 200 m | 0.8 pm | 40 pm |
| 1000 m | 4 pm | 200 pm |
| 2 km | 8 pm | 400 pm |
| 20 km | 80 pm | 4 nm |
| 40 km | 160 pm | 8 nm |
| 100 km | 400 pm | 20 nm |

Table 1 illustrates the speed of light effects on swept wavelength-based sensor measurements on a single sensor (of a given wavelength). Sensor systems most often contain a plurality of sensors of different characteristic or central wavelength. If the wavelength scan rate of the swept wavelength source were continuous and linear across its scan range, the approximations in Table 1 could form the basis of a sufficient compensation technique. However, many implementations of swept wavelength sources exhibit non-linear slew rates (changes in scanning rates) across the swept wavelength spectrum. The term slew rate is used herein to refer to variations in the scanning rate of the swept wavelength laser as a function of progression of the scan along the wavelength range that is scanned. Due to non-linear variations in slew rate of the swept wavelength source, the resulting time of flight induced error can be different for different wavelength sensors, even if they are positioned at the same physical distance from the interrogation equipment. Moreover, thermal sensitivity in the non-linear slew rate of the laser can also lead to additional offset in sensor wavelength detected simply by changing ambient environmental conditions of the swept wavelength laser interrogation system.

The time of flight delay will also be affected, to some degree, by the temperature of the lead-in fiber itself. For a nominal ratio of index change to temperature change in optical fiber dn/dT=1×10$^{-5}$/°C.

The change in refractive index over a 0 to 65° C. operating temperature will be ~0.065%. For a round trip distance of 100 km and a nominal refractive index of 1.4682, two times-of-flight based upon the refractive index extremes would be:

$t_1$=100,000 m*(s/2.997×10$^8$ m)*(1.4682)=489.890 μs $t_2$=100,000 m*(s/2.997×10$^8$ m)*(1.00065*1.4682) =490.21 μs

Using this difference of 490.21−489.89=0.32 μs and the earlier wavelength offset per unit delay estimation of 800 pm/20 μs, we can conclude that for a swept wavelength laser running at 250 Hz over a temperature range of 65° C. and a round trip fiber lead-in of 100 km, the maximum wavelength offset that should be perceived is 800 pm/20 μs*0.32 μs=12.8 pm For a swept wavelength laser system running at over a temperature range of less than 65° C. or distances less than 100 km, the maximum wavelength offset will be correspondingly smaller.

The wavelength offset of sensor wavelengths can be corrected by knowledge of the optical path length to the sensor. This optical path length is a product of the physical length and the refractive index. Optical path lengths can be derived in several ways. A preferred method for generating the requisite sensor distance information is as described herein to measure directly that distance using the swept wavelength optical source sensor interrogator itself. This method only requires access to one end of the fiber. The resulting distance data can be used both for its intrinsic information value as well as for speed of light based wavelength shift compensation.

Perceived sensor wavelength offsets due to L, slew rate of the swept wavelength source, and temperature effects are corrected in sensor interrogation systems of FIG. 1 by determining the optical path length to each sensor and employing the path lengths determined to correct for wavelength offset for each sensor. To determine optical path length to a sensor, the swept wavelength optical source employed in the generic sensor system of FIG. 1 must be capable of wavelength scanning at two or more different scan (or sweep) rates. In a specific embodiment, two scan rates (a first scan rate, SR1, and a second scan rate, SR2) are used and more specifically one scan rate is twice the other. In the following illustrations of FIGS. 6 and 8A-8H, nominal scan rates of 500 Hz (SR1) and 1 KHz (SR2) are used.

As noted above, a portion of the optical source signal is coupled to a wavelength reference that monitors the transmitted output wavelength as a function of time. The sensor measurement channels contain optical receivers and associated data processing hardware (FIGS. 2-4) that determines a particular characteristic of the detected sensor waveform, such as the peak, center, or 3 dB value. The time at which a particular sensor measurement is triggered is correlated to the optical source wavelength supplied via the optical reference channel.

Figure 6A:
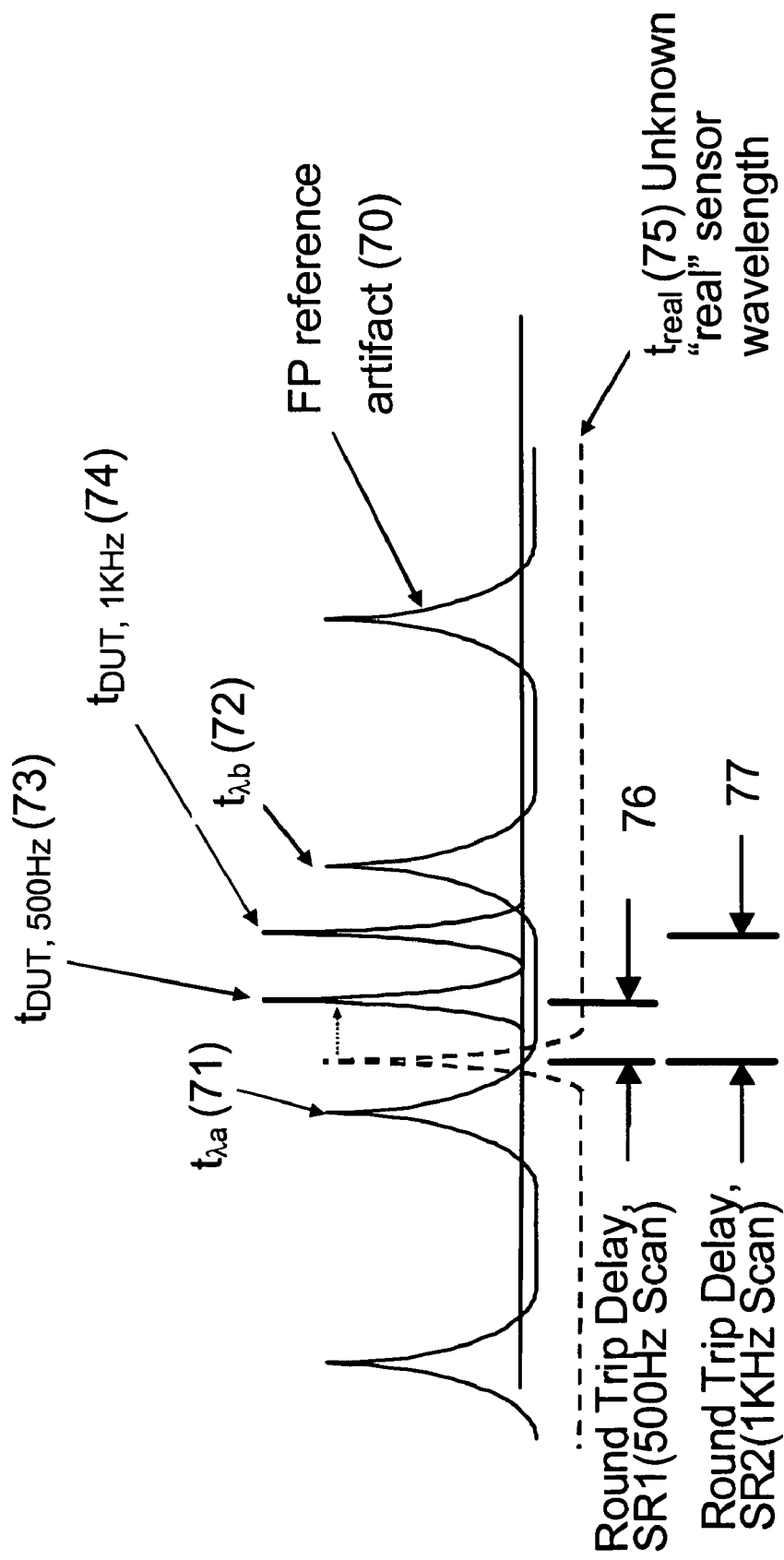
FIG. 6A is a schematic diagram illustrating timing of dual sweep rate sensor measurement, resulting in two time delays for use in distance calculations and in correction of wavelength offset (simplified case).

FIG. 6A illustrates the basic measurement technique (as show in FIGS. 5A and B) used in an optical swept source interrogation system to determine the optical sensor wavelengths under test with the modification that measurements of a given sensor are made at two different scan rates of the swept optical source. When the optical reference is scanned by the tunable optical source, well-defined peaks are produced at evenly spaced, known wavelength intervals (70). Two wavelength peaks, designated $t_{\lambda,a}$ (71) and $t_{\lambda,b}$ (72), respectively, represent the reference wavelength peaks just below and above the sensor wavelength under test at each scan rate, $t_{DUT(500 Hz)}$ (73) or $t_{DUT(1 kHz)}$ (74). The wavelength of the optical sensor under test, $t_{DUT(real)}$ (75), is determined by interpolation based on the known reference wavelength peaks. This illustration exemplifies the simplest case in which both $t_{DUT, 500 Hz}$ and $t_{DUT, 1 kHz}$ are detected in time between the same two FP reference peaks, here labeled as $t_{\lambda,a}$ and $t_{\lambda,b}$. As such, the same values for $t_{\lambda,a}$ and $t_{\lambda,b}$ and the same values of λa and λb are used with equations 1 and 2 for calibrations of the sensor wavelength at both scan rates.

Figure 6B:
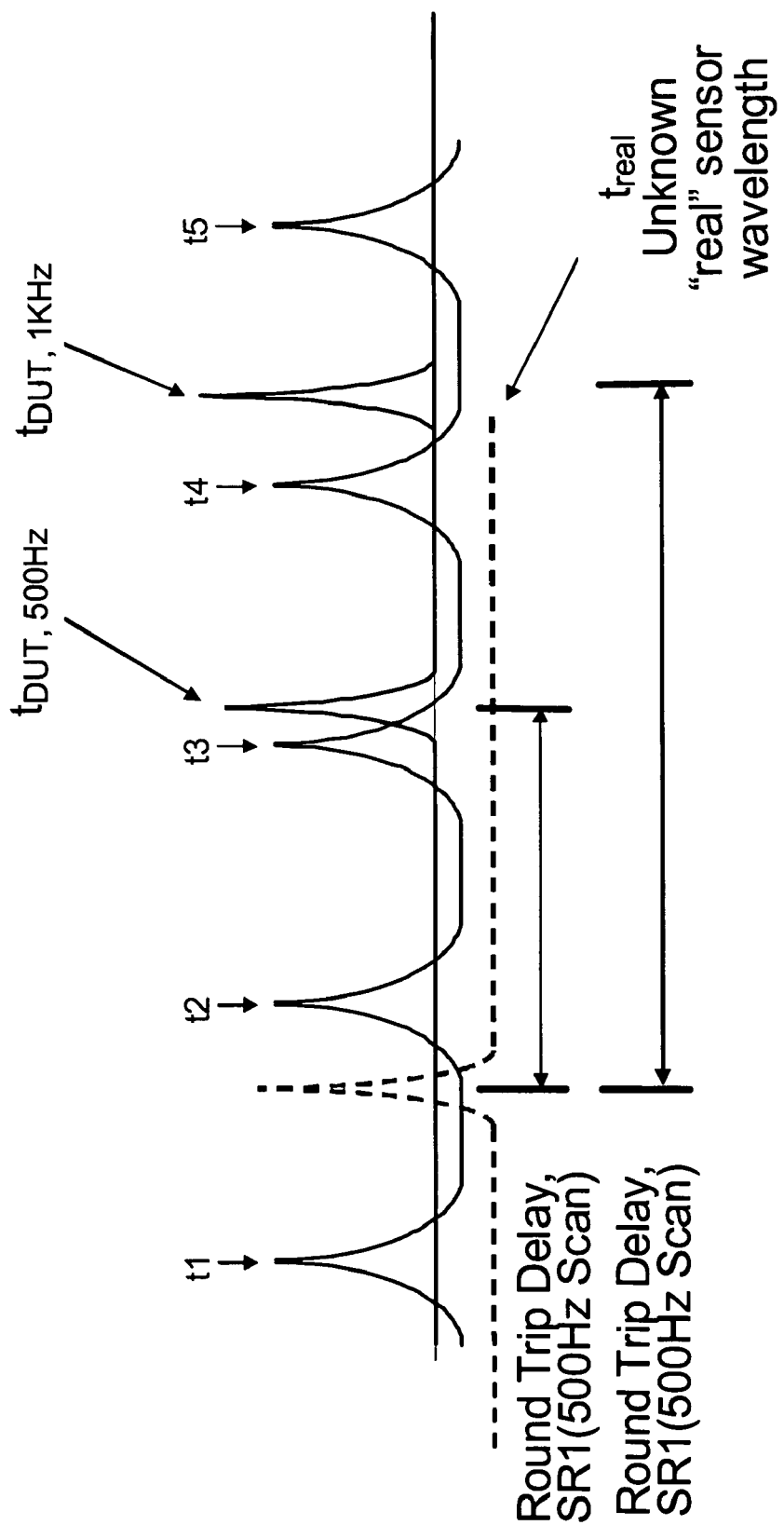
FIG. 6B is a schematic diagram illustrating timing of dual sweep rate sensor measurement, resulting in two time delays for use in distance calculations and in correction of wavelength offset (general case).

FIG. 6B shows the more generic case for the distance calculation algorithm. In this case, the normalized times at which the sensor is measured at the two laser scan rates fall between two different sets of FP reference peaks. The actual time of flight for the two signals is identical, but the rate at which the reference peaks are scanned differs for the two scan rates. When the distance-induced time of flight is greater than the time it takes for one FSR to be scanned, the two normalized times at which the sensor is measured will often return in between different sets of PF peaks.

Figure 7:
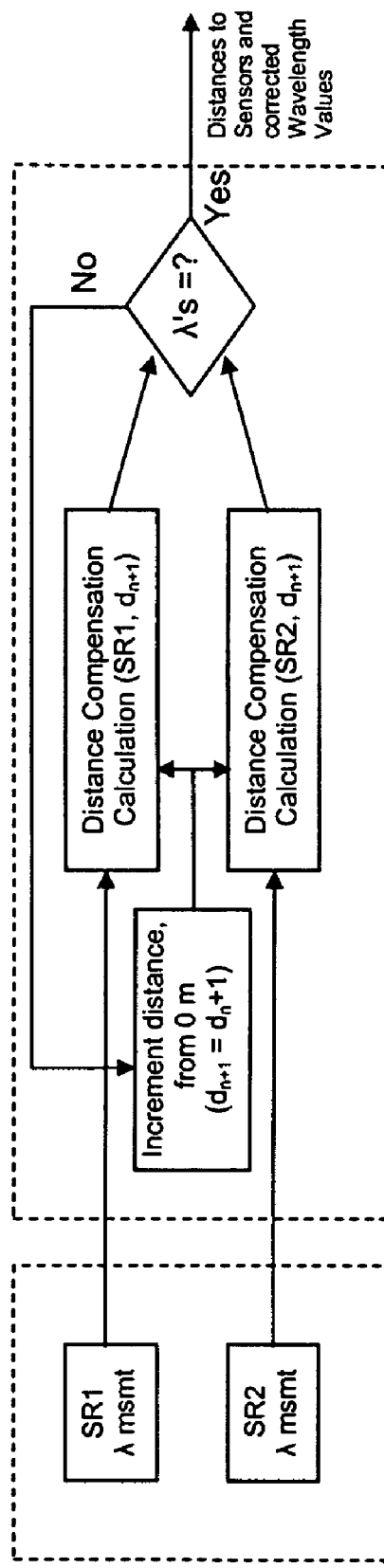
FIG. 7 is an operational flow chart for an exemplary time-of-flight based distance measurement computational algorithm.

The peaks that are selected for the interpolation calculations of equations 1 and 2 are based upon the normalized actual, and then the normalize distance-adjusted (corrected) times at which the sensor is measured at each of the two scan rates, according to a selected iteration process, such as that illustrated in FIG. 7.

For example, on the first iteration, the perceived wavelength of the sensor at 1 kHz with a test distance value of 0 will be based upon an interpolation between the two peaks that surround the time at which the sensor is measured, in this case two rightmost FP reference peaks, t4 and t5, where t4=$t_{\lambda,a}$ and t5=$t_{\lambda,b}$. The wavelengths λa and λb used in the calculations will be selected to reflect the correct reference wavelengths for peaks t4 and t5, and the calculations will be performed according to equations 1 and 2. Similarly, on the first iteration, the perceived wavelength of the sensor at 500 Hz (SR1) with a test distance value of 0 will be based upon and interpolation between the two reference peaks that surround the time at which the sensor is measured, in this case, t3 and t4, where t3=$t_{\lambda,a}$ and t4=$t_{\lambda,b}$. The wavelengths λa and λb used in the calculations will be selected to reflect the correct reference wavelengths for peaks P4 and P5, and the calculations will be performed according to equations 1 and 2.

As the test distance is increased, and the normalized time for the sensor at each scan rate is decreased, the choice of bracketing FP reference peaks may change, but the procedure for calculation each wavelength will remain the same. Ultimately, as the test distance increases and the difference between the perceived measured sensor wavelengths measured at the first and second scan rates (1 kHz and 500 Hz) converge, so will the choice of bracketing FP reference peaks for equations 1 and 2.

In performing a distance measurement for a selected optical sensor, the source is scanned at two different rates. Those different scan rates result in two different normalized, proportional time delays for the same selected optical sensor at the same physical distance along a lead in fiber (L) from the swept wavelength laser interrogator. In the examples of FIGS. 6A and 6B, two scan rates of 500 and 1 kHz are used, and the two time delayed signals from the same nominal sensor at the same nominal distance are represented. The dashed line represents the conceptual "real" sensor signal (75), as though there were no fiber lead in distance of significance in the optical circuit as laid out in FIG. 1. The line with peak labeled 73 represents a time delayed signal from the optical sensor measured at the unknown distance with a scan rate of 500 Hz. The line with peak labeled 74 represents a time delayed signal from the optical sensor measured at the unknown distance with a scan rate of 1 KHz. In all cases, the X axis is proportional time normalized to the total acquisition period for each scan rate. In this way, the fixed time of flight to the optical sensor shows as an increased proportion of the total acquisition time of the 1 kHz scan, as compare to the ½ speed 500 Hz scan.

FIG. 6A also shows the proportional conceptual round trip delay between the 500 Hz trace and the unknown "real" trace (76) and the proportional conceptual round trip delay between the 1 kHz trace and the unknown "real" trace (77). With knowledge of the total acquisition time of the 500 Hz and 1 kHz scans, and with the two "perceived" wavelength measurements resulting from the scans at the two different scan rates, a series of two simultaneous equations with two unknowns are solved to deduce both the actual distance to the sensor and the actual wavelength of the sensor, unaffected by the fiber lead in length.

$$\lambda_{Real} = f(t_{DUT, 500 Hz}, SR1)$$

$$\lambda_{Real} = g(t_{DUT, 1 kHz}, SR2)$$

where, SR2=2*SR1, where SR1 and SR2 are normalized time delays for each laser sweep, at 500 Hz and 1 kHz, respectively.

The calculation of sensor distance can be performed in a number of ways. First, a mathematical fit function can be derived at both scan rates relating the known wavelengths of the Fabry-Perot reference signal to the times at which those FP peaks were detected. With a known or assumed optical index (the index divides out of the equations, so an actual value is not needed) a variable for the time of flight in the fiber of the optical sensor signal can be established. The other unknown variable in the two equations is the actual wavelength of the sensor. The time at which the optical sensor peak was detected at both scan rates is known. Thus a series of two equations and two unknowns can be set up. Solving for the two variables yields accurate measurements of both the optical distance to the sensor and its actual wavelength, unaffected by the fiber lead in length.

The values for distance-to-sensor and actual wavelength can also be calculated iteratively, as demonstrated in flow chart of FIG. 7. The order of operations is as follows. First, a scan of the optical source is made at a first scan rate (SR1, e.g., 500 Hz) and then a scan of the optical source is made at a second scan rate (SR2, e.g., 1 kHz). The normalized timing signals for the reference scans in both cases are the same, as the distances to the reference arms of the optical circuit are negligible. The normalized timing signals for the measured sensor for the two different will differ based upon the distance to the sensor and the corresponding time of flight for the optical signal. One of ordinary skill in the art will recognize that methods other than that specifically exemplified in FIG. 7 are known in the art and can be readily applied for iteratively calculating the distance and actual wavelength.

Calculation for wavelength of each sensor is performed, as described above, with one significant difference. As part of the wavelength calculation, a unit of time for each of the sensor measurements is subtracted from the received signals. That unit of time reflects the time of flight in the fiber for an assumed distance (test distance) to the sensor. On the first calculation, a first test distance (td1) is used, for example td1 of zero can be used, reflecting an initial assumption of no fiber lead-in length. It should be noted that the actual time of flight to the sensor at both scan rates is the same. The unit of time that is subtracted from the received signal is scaled to the total acquisition time of the laser interrogator for each scan rate. Put simply, a 1 microsecond delay on a sensor measurement taken at 1 kHz will have an approximately double affect on the resultant wavelength calculation than would the same 1 microsecond delay on a 500 Hz scanned measurement.

Starting with a zero meter distance assumption, this distance compensated wavelength calculation is performed on the common sensor with common lead-in fiber length. When calculations for both the 500 Hz and 1 kHz measurements are complete, the resulting wavelength measurements are compared to provide a test wavelength difference ($\Delta tw1$). If the test wavelength difference for the wavelength measurements for the same sensor obtained from scans at the two different scanning rates are within a selected low margin of error, I.e., if $\Delta tw1$ is less that a selected acceptable value, the test distance used to correct the wavelength calculations is determined to be accurate within the selected error and the distance to the sensor and the actual sensor wavelength is concluded to be known. If the two wavelength values are not within the selected acceptable value range, the test distance is determined to be too low and an increased td2 is selected and the calculations are repeated. This iterative process continues with increasing test distance values (i.e. td(n), where n is 1, 2, . . . n) used to calculate corresponding test wavelength differences (i.e., $\Delta tw(n)$, where n is 1, 2, . . . , n) until the selected test distance at which the test wavelength difference is less that the selected acceptable wavelength difference which indicates that the corrected sensor wavelength values measured at the two different scan rates are equal. The test distance that results in the acceptable low $\Delta tw$ is determined to be the actual or real distance to the sensor and the wavelengths calculated are determined to be the corrected wavelength from the sensor.

After scanning the wavelength of the sensors at two different scan rates, the iterative process can be repeated for each sensor that is to be measured and can be repeated for a given sensor as needed or desired for measurement of wavelength changes associated with a given sensor. As described above, the iteration process involves a selected increase in the test distance for each pair of subsequent wavelength calculations. In practice, with knowledge of the ratio of scan rates and the approximate affect of the time delay on the wavelength measurements, more efficient scaled iterations of test distance can be made.

The method as illustrated above can be employed to correct wavelength offset in sensor measurements or it can be used to determine the distance of one or more sensors from the sensor interrogator system. The method is particularly useful for sensor systems in which the sensors are at least 100 m from the sensor interrogator. The method can be applied to the measurement of a plurality of sensors in a sensor array.

FIGS. 8A-8H show a graphical representation of the actual timing signals and the derived time-adjusted signal for each scan rate (500 Hz and 1 kHz) at each of four test distances during an actual distance measurement. In each case a plot of the 500 Hz scan rate data acquisition (FIGS. 8A, C, E and G) is compared to a corresponding plot of the 1 kHz acquisition (FIGS. 8B, D, F and H). For each plot, the set of FP reference peaks of known spacing (designated red peaks) and the internal FBG component of the wavelength reference which marks the reference peaks in the referencing scheme (designated the white peak) are shown. Each plot also contains the measured signal (presumed time delayed) from a selected optical sensor at an unknown distance (tallest of the two taller peaks) designated the black peak, and the time adjusted signal (designated the blue peak) calculated based on an assumed test distance to the sensor. In the following example, the acceptable wavelength difference is selected to be 1 pm or less.

Starting with FIGS. 8A and B, certain effects can be seen. First, the relative difference between (which can be enumerated by the number of red peaks) the reference FBG peak (white) and the time of flight delayed optical sensor (black) is different for the 500 Hz scan (8A) and the 1 kHz scan (8B). This again illustrates that the same time of flight manifests as different perceived normalized, proportional timing shifts for the two acquisition rates. FIGS. 8A and 8B reflect the output of the first iteration of the distance measurement computation, with a selected test distance of zero. There is no difference in each measured and corrected timing signal for each acquisition, as is reflected in the coincident black and blue traces on each graph. Using the interpolation calibration method described above, a wavelength calculation is performed for each acquisition rate (scan rate) and the wavelength difference between the measured wavelengths at the two different scan rates is measured to be 4.1705 nm which is higher than the selected acceptable difference. Note that if the measured difference between the two wavelengths measured at the two different scan rates were determined to be below the selected acceptable wavelength difference than it would be determined that no unacceptable level of wavelength offset is present and no correction would be needed. Selection of the first test distance to be zero is a convenient starting point for iteratively increasing the test distance, however iteration of the test distance can be started at a non-zero value. The initial selection of the test distance can be made based on a known approximate distance of the sensors or at any reasonable value that is likely to approximate the actual distance.

As the wavelength difference calculated using td=0, is not negligible, the distance estimate is incremented. Next, in the illustration of FIGS. 8C and 8D, n increased test distance of 2085 meters is employed Note now that for each scan rate, the measured and calculated timing signals (black and blue, respectively) have begun to separate. Also note, though, that the distance between the known white reference FBG and the calculated blue signals are still distinctly different. The resulting wavelength difference calculation is 1.998 nm for the 2085 meter test distance. Again the calculated wavelength difference is higher than the selected acceptable wavelength difference of less than 1 pm.

FIGS. 8E and 8F show the results of another iteration of the test distance. In this case, a test distance of 3795 meters was assumed and used, and a wavelength difference of only 0.225 nm (225 pm) was calculated. Again the calculated wavelength difference is higher than the selected acceptable wavelength difference of less than 1 pm.

FIGS. 8G and H show another iteration of the test distance. In this case a test distance value of 4015.2 meters was employed and a wavelength difference of 0.0001 nm (0.1 pm) is calculated. Note in the Figures that the relative difference between the white and blue traces are nearly identical, resulting in the highly comparable corrected wavelength values for both scan rate. At this point, the iteration is complete, because the calculated wavelength difference is below the selected acceptable value noted above. The distance to the sensor is thus concluded to be 4015.2 meters and the wavelength value generated with the compensation distance of 4015.2 meters is concluded to be the actual peak resonance wavelength of the optical sensor.

Various schemes for performing the iterative process for determining the distance can be used. In a specific embodiments, a standard secant method, specifically a modified Newton-Raphson method with the assumption that there is only one zero, is employed. To ensure reliable and repeatable measurements, the entire iterative process or appropriate portions thereof, as described above, may be repeated and the resulting values averaged, until an acceptable distribution of measurements is achieved.

In a specific embodiment, the method for determining the distance to a given optical sensor is carried out by sequentially scanning at a first scanning rate (SR1) and at a second scanning rate (SR2) to acquire data for each pair of sequential scans at different rates followed by the iterative process based on minimizing the wavelength difference between corrected measured wavelengths for a given sensor at the two different scanning rates. Acquisition of data for wavelength comparison in sequential scanning at the two different scan rates is believed to minimize measured wavelength differences due to variation unrelated to distance. However, it will be understood that such sequential data collection is not required. The process can be conducted by acquiring averaged results of a number of scans at one scanning rate followed by acquiring averaged results of a number of scans at a second scanning rate. The iterative process for minimizing the wavelength difference can be conducted using the corrected average wavelengths. It is preferred to minimize the time between scans at different scan rates in which the data are to be iteratively processed to iteratively determine distance.

This application relates to the speed of light effects in swept wavelength laser fiber optic sensor measurements and the methods and devices taking advantage of that effect. Applications of the invention include, among others, use of a dual speed scanning technique allowing a swept wavelength laser sensing system to fully self-compensate for what might otherwise become distance induced wavelength measurement error and use of a dual speed scanning technique which generates additional information about the optical sensors in the form of absolute distance measurements to the sensors.

In generally any swept wavelength source that can be scanned at more than one scanning rate can be employed in sensor interrogation systems of this invention. The methods herein are generally applicable to optical sources that can be scanned (wavelength tuned) at scan rates of 50 Hz or higher and are particularly applicable to optical sources that can be operated at scan rates of 100 Hz and higher, including the broad range 50 Hz to 10 KHz and 100 Hz to several KHz). The method can be implemented in particular with high speed swept filter and swept wavelength lasers. Particularly useful swept wavelength lasers are optical fiber lasers as described in Yun et al. 91998) Optics Letters 23(11) 843-845 and U.S. Pat. No. 6,449,047.

In general, the methods herein are applicable to any sensor interrogator systems in which identification and measurement of sensor wavelength depends upon the time at which a sensor wavelength arrives at a detector. Useful sensor interrogator systems include, among others, those of U.S. Pat. Nos. 6,115,122, 7,157,693 and 7,060,967. The methods herein are particularly useful for use with swept laser interrogators (e.g., swept ECL) and swept broadband optical source interrogators (e.g., SLED-TF, ASE-TF) particularly those which employ tunable F-P filters. The methods herein are particularly useful in those sensor systems in which there is a sufficiently long distance between the measurement detector and any sensor to generate a non-negligible undesirable wavelength offset. The fiber length that will lead to undesirable levels of offset generally depends upon the desired level of sensitivity of wavelength measurement and the scan rate of the swept wavelength source (see Table 1). Methods of this invention for correcting for wavelength offset are more useful in those systems in which the swept wavelength source is scanned at rates above 50 Hz and for round-trip fiber lengths of 50 m or more (e.g., 50 m to tens of kilometers). Methods of this invention for correcting for wavelength offset can provide wavelength measurement sensitivity of 10 pm or less, more specifically can provide sensitivity of 2 pm or less and preferably provide sensitivity of 1 pm or less. Particularly useful wavelength references are described in U.S. Pat. Nos. 5,838,437, 5,892,582, 6,115,122 and 6,327,036.

When a group of device elements, materials or methods is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every combination of components described or exemplified herein can be used to practice the invention, unless otherwise stated. Whenever a range is given in the specification, for example, a temperature range, a time range, a distance range, a wavelength range or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein the broad term "comprising" includes the narrower "consisting essentially of" and the yet again narrower "consisting of".

The invention illustratively described herein suitably may be practiced in the absence of any element or elements, limitation or limitations which are not specifically disclosed herein.

One of ordinary skill in the art will appreciate that materials, substrates, device elements, light sources, light detectors, calibration methods, spectroscopic methods and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

All references cited herein are hereby incorporated by reference to the extent that there is no inconsistency with the disclosure of this specification. Some references provided herein are incorporated by reference to provide details concerning components of and operation of optical sensor systems, components of and operation of optical interrogation systems, components of and operation of optical detectors or optical sources appropriate for use in the systems and methods herein, additional measurement methods and additional uses of the invention.

One or more of the following patent documents can provide details of interrogations systems including wavelength references and FFP (fiber Fabry-Perot filters) useful in this invention: U.S. Pat. Nos. 7,063,466; 6,904,206; 5,838,437; 5,289,552; 5,212,745; 6,241,397; 5,375,181; 6,504,616; 5,212,746; 5,892,582; 6,115,122; 6,327,036; 5,422,970; 5,509,093; 5,563,973, U.S. patent application Ser. No. 11/452,094 filed Jun. 12, 2006, U.S. provisional application Ser. No. 60/824,266, filed Aug. 31, 2006 and U.S. application Ser. No. 11/848,028, filed Aug. 30, 2007 Each of the cited patents or patent applications is incorporated by reference herein in its entirety to provide a description of devices or device components useful in this invention.

We claim:

1. A method for determining the distance from an optical sensor interrogation system to a fiber optical sensor optically coupled through a length of optical fiber to the interrogation system which comprises the steps of:
 (a) providing the sensor interrogation system with a swept wavelength optical source which can be operated at two or more different known scan rates;
 (b) scanning the swept wavelength optical source at a first known scanning rate and determining a first measured wavelength of the optical sensor at the first scan rate;
 (c) scanning the swept wavelength optical source at a second known scan rate and determining a second measured wavelength of the optical sensor at the second scan rate, wherein the first and second scan rates are different;
 (d) calculating the distance from the optical sensor interrogation system to the fiber optical sensor assuming that the actual wavelength from the optical sensor is the same for the first and second scans and employing the first and second known scan rates and the first and second measured wavelengths of the fiber optical sensor measured at the two different scan rates.

2. The method of claim 1 wherein the distance is calculated by an iterative process in which a test distance is incrementally changed to calculate a first corrected wavelength from the first measured wavelength and a second corrected wavelength from the second measured wavelength said iterative process being continued until the difference between the first corrected wavelength and the second corrected wavelength calculated from the incremented test distance is minimized, the test distance which satisfies this condition is determined to be the distance between the sensor interrogation system and the fiber optical sensor.

3. The method of claim 1 wherein the first and second measured wavelengths are determined from sequential first and second scans at first and second scan rates.

4. The method of claim 1 wherein the first scan rate and the second scan rate differ by a factor of two.

5. The method of claim 1 wherein the swept wavelength optical source is a swept wavelength laser.

6. The method of claim 1 wherein the swept wavelength optical source is selected from the group consisting of an external cavity swept wavelength laser, a distributed Bragg reflector laser and a broadband source in combination with a tunable filter.

7. The method of claim 1 wherein the swept wavelength optical source can operate at scan rates of 50 Hz or higher.

8. The method of claim 1 wherein the sensor interrogator comprises a wavelength reference which in turn comprises a fiber Fabry-Perot filter to provide a comb of peaks of known spacing and a reference FBG to provide a peak of known wavelength to mark and identify the wavelengths of the comb of peaks.

9. The method of claim 1 wherein the optical sensor is a sensor in a sensor array and the distance is determined to two or more sensors in the sensor array.

10. A method for correcting offset in the measured wavelength of a fiber optical sensor as measured in a sensor interrogator system which comprises a swept wavelength optical source, the offset due to finite speed of light time of flight delays in optical fibers, comprising the steps of:
 (a) determining the distance from the fiber optical sensor to the interrogator system by the method of claim 1; and
 (b) correcting the measured wavelength employing the distance determined in step (a).

11. The method of claim 10 wherein the distance is calculated by an iterative process in which a test distance is incrementally changed to calculate a first corrected wavelength from the first measured wavelength and a second corrected wavelength from the second measured wavelength said iterative process being continued until the difference between the first corrected wavelength and the second corrected wavelength calculated from the incremented test distance is minimized, the test distance which satisfies this condition is determined to be the distance between the sensor interrogation system and the fiber optical sensor.

12. The method of claim 10 wherein the first and second measured wavelengths are determined from sequential first and second scans at first and second scan rates.

13. The method of claim 10 wherein the swept wavelength optical source can operate at scan rates of 50 Hz or higher.

14. The method of claim 10 wherein the fiber optical sensor is an FBG or a fiber Fabry-Perot sensor.

15. The method of claim 10 wherein the fiber optical sensor is at least 100 m from the interrogation system.

* * * * *